US010440273B2

(12) United States Patent
Kojima (10) Patent No.: US 10,440,273 B2
(45) Date of Patent: Oct. 8, 2019

(54) IMAGING APPARATUS THAT DISPLAYS AN OVERLAY SETTING SCREEN FOR INPUTTING FOCAL LENGTH INFORMATION FOR INTERCHANGEABLE LENS AND FOR QUANTITATIVELY INDICATING A MAGNITUDE OF A BLUR

(71) Applicant: Panasonic Intellectual Property Management Co., Ltd., Osaka (JP)

(72) Inventor: Hiroyuki Kojima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/260,375

(22) Filed: Jan. 29, 2019

(65) Prior Publication Data

US 2019/0253630 A1    Aug. 15, 2019

(30) Foreign Application Priority Data

Feb. 15, 2018    (JP) .................................. 2018-024865
Dec. 17, 2018    (JP) .................................. 2018-235014

(51) Int. Cl.
*H04N 5/228*    (2006.01)
*H04N 5/232*    (2006.01)

(52) U.S. Cl.
CPC ..... *H04N 5/23287* (2013.01); *H04N 5/23209* (2013.01); *H04N 5/23293* (2013.01)

(58) Field of Classification Search
CPC combination set(s) only.
See application file for complete search history.

(56) References Cited

U.S. PATENT DOCUMENTS

| 2004/0114251 | A1* | 6/2004 | Kaneda | G02B 7/102 359/694 |
| 2006/0082663 | A1* | 4/2006 | Rooy | H04N 5/2624 348/231.99 |
| 2006/0103751 | A1* | 5/2006 | Lee | H04N 5/23293 348/333.02 |
| 2011/0050923 | A1* | 3/2011 | Nomura | G03B 7/097 348/208.99 |

(Continued)

FOREIGN PATENT DOCUMENTS

| JP | 2008-054062 | 3/2008 |
| JP | 2009-251493 | 10/2009 |
| WO | 2013/183333 | 12/2013 |

*Primary Examiner* — Gary C Vieaux
(74) *Attorney, Agent, or Firm* — Renner, Otto, Boisselle & Sklar, LLP (57) ABSTRACT

The imaging apparatus to which an interchangeable lens is mountable includes an imaging device, a shake detector that detects a shake amount of the imaging apparatus, an image stabilization unit that performs an image stabilization operation by moving the imaging device based on the detected shake amount and a focal length of the interchangeable lens, a display unit that displays a setting screen for inputting focal length information item of the interchangeable lens, and a controller that controls the display unit and the image stabilization unit. The controller reflects the focal length information item displayed in the setting screen in the image stabilization operation performed by the image stabilization unit while causing the display unit to display and overlay the setting screen on a live view image.

6 Claims, 11 Drawing Sheets

(56) References Cited

U.S. PATENT DOCUMENTS

| | | | |
|---|---|---|---|
| 2012/0154613 A1* | 6/2012 | Honjo | G03B 5/00 |
| | | | 348/208.4 |
| 2014/0300688 A1* | 10/2014 | Shin | H04N 5/23238 |
| | | | 348/36 |
| 2017/0187960 A1* | 6/2017 | Tsuchiya | H04N 5/23258 |

* cited by examiner

IMAGING APPARATUS THAT DISPLAYS AN OVERLAY SETTING SCREEN FOR INPUTTING FOCAL LENGTH INFORMATION FOR INTERCHANGEABLE LENS AND FOR QUANTITATIVELY INDICATING A MAGNITUDE OF A BLUR

BACKGROUND

1. Technical Field

The present disclosure relates to an imaging apparatus to which an interchangeable lens can be mounted and which includes a camera body having an image stabilization function.

2. Description of the Related Art

An imaging apparatus to which an interchangeable lens can be mounted performs communication with the interchangeable lens to acquire, from the interchangeable lens, information relating to the interchangeable lens such as a focal length and an F value, and controls the operation of the interchangeable lens and a camera body based on the acquired information. For example, when performing an image stabilization, the imaging apparatus determines a correction amount based on the focal length of the interchangeable lens.

WO 2013/183333 A (PTL 1) discloses an imaging apparatus that appropriately controls an operation, even when information relating to an interchangeable lens cannot be acquired from the interchangeable lens because of the interchangeable lens being connected to a camera body via an accessory.

The imaging apparatus disclosed in PTL 1 includes a communication unit that communicates with the accessory, a controller that controls the imaging apparatus, an input unit that receives an input from a user, a display unit that displays information relating to the input from the user, an imaging device that converts an optical image of a subject into an electric signal, and an image stabilization unit that performs an image stabilization of the imaging device. The communication unit can communicate with the accessory. When identifying that the accessory is a mount adaptor, the controller displays a screen requiring a user to input information relating to the interchangeable lens mounted to the mount adaptor in the display unit. When receiving an input from the user, the controller controls the imaging apparatus based on the input from the user.

The information relating to the interchangeable lens includes information relating to a focal length of the interchangeable lens. The controller controls the image stabilization unit based on the information relating to the focal length of the interchangeable lens input by the user. As described above, in PTL 1, the apparatus requires the user to input the information relating to the focal length of the interchangeable lens on a screen, and thus enables an appropriate image stabilization even when the information relating to the focal length cannot be acquired from the interchangeable lens through communication.

SUMMARY

The present disclosure provides an imaging apparatus capable of achieving a precise image stabilization according to a focal length of an interchangeable lens that does not have a communication function, even when such an interchangeable lens is mounted.

An imaging apparatus according to a first aspect of the present disclosure is an imaging apparatus to which an interchangeable lens is mountable. The imaging apparatus includes an imaging device, a shake detector, an image stabilization unit, a display unit, and a controller. The imaging device generates image data based on an image formed through the interchangeable lens. The shake detector detects a shake amount of the imaging apparatus. The image stabilization unit performs an image stabilization operation by moving the imaging device based on the detected shake amount and a focal length of the interchangeable lens. The display unit displays a setting screen. The setting screen is a screen for inputting a focal length information item which is at least one of the focal length of the interchangeable lens and information corresponding to the focal length. The controller controls the display unit and the image stabilization unit.

Herein, an image to be formed based on the image data generated by the imaging device in real time is defined as a live view image. The controller causes the image stabilization unit to perform the image stabilization operation in accordance with the focal length information item received via the setting screen, while causing the display unit to display and overlay the setting screen on the live view image.

An imaging apparatus according to a second aspect of the present disclosure is an imaging apparatus to which an interchangeable lens is mountable. The imaging apparatus includes an imaging device, a shake detector, an image stabilization unit, a display unit, and a controller. The imaging device generates image data based on an image formed through the interchangeable lens. The shake detector detects a shake amount of the imaging apparatus. The image stabilization unit performs an image stabilization operation by moving the imaging device based on the detected shake amount and a focal length of the interchangeable lens. The display unit displays a setting screen. The setting screen is a screen for inputting a focal length information item which is at least one of the focal length of the interchangeable lens and information corresponding to the focal length. The controller controls the display unit and the image stabilization unit. The controller causes the display unit to display information quantitatively indicating a magnitude of a blur of the live view image in the setting screen. Herein, the live view image is formed based on the image data generated by the imaging device in real time.

According to the imaging apparatus in the present disclosure, a user can check the effect of the image stabilization while viewing the live view image, and can input the focal length of the interchangeable lens while checking the effect of the image stabilization. Thus, the user can set a proper focal length of the interchangeable lens, whereby a high-precise image stabilization function can be achieved.

BRIEF DESCRIPTION OF THE DRAWINGS

FIG. 4 is a flowchart showing a process when a power supply of the digital camera is turned on;

DETAILED DESCRIPTION

Exemplary embodiments of the present disclosure will be described below with reference to the drawings. Note, however, that unnecessary parts in the description regarding conventional arts and substantially identical configurations may be omitted in the detailed description. This is to simplify the description. The following description and the accompanying drawings are provided to help those skilled in the art to fully understand the present disclosure and are not intended to limit the subject matter recited in the appended claims. In the following description, a digital camera is used as an example of the imaging apparatus.

First Exemplary Embodiment

The digital camera according to the present exemplary embodiment includes a camera body to which an interchangeable lens can be mounted. The camera body has a vibration correction function for reducing an influence of a vibration of the camera on a captured image. Specifically, the digital camera detects vibration by a shake detector in the camera body. The digital camera moves an image sensor such as a charge coupled device (CCD) in a plane perpendicular to an optical axis of an optical system according to the detected vibration. With this, the digital camera reduces an influence of the vibration. A function for correcting vibration by moving the image sensor as described above is hereinafter referred to as a "body image stabilizer (BIS) function".

[1. Configuration]

Figure 1:
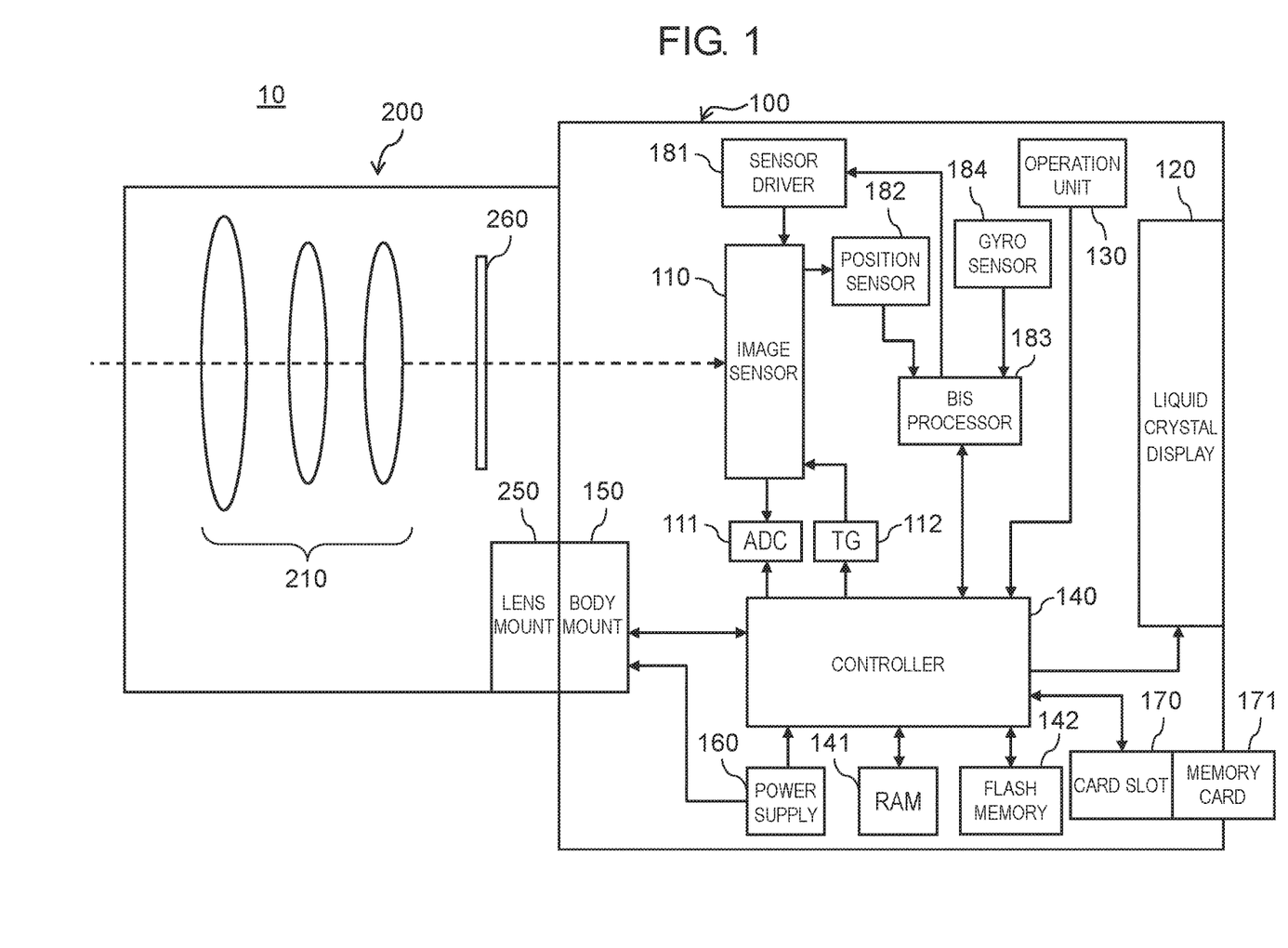
FIG. 1 is a block diagram showing a configuration of a digital camera according to a first exemplary embodiment of the present disclosure.

FIG. 1 is a block diagram showing a configuration of the digital camera according to the first exemplary embodiment of the present disclosure. Digital camera 10 includes camera body 100 and interchangeable lens 200 detachably mounted to camera body 100.

[1-1. Camera Body]

Camera body 100 (an example of the imaging apparatus) includes image sensor 110 (an example of the imaging device), liquid crystal monitor 120 (an example of the display unit), operation unit 130, controller 140 (an example of the controller), body mount 150, power supply 160, and card slot 170.

Controller 140 controls components, such as image sensor 110, according to an instruction input via a release button, thereby controlling the entire operation of digital camera 10. Controller 140 is achieved by a semiconductor element, for example. Controller 140 may be configured with hardware alone or may be achieved by a combination of hardware and software. For example, camera controller 140 can be achieved by a processor such as a central processing unit (CPU), a micro processing unit (MPU), a digital signal processor (DSP), a graphics processing unit (GPU), a field-programmable gate array (FPGA), and an application specific integrated circuit (ASIC). Controller 140 transmits a vertical synchronizing signal to timing generator (TG) 112. In parallel with such transmission, controller 140 generates an exposure synchronizing signal. When the interchangeable lens has a communication function, controller 140 can periodically transmit the generated exposure synchronizing signal to the interchangeable lens via body mount 150. Controller 140 uses dynamic random access memory (DRAM) 141 as a working memory when performing a control operation and image processing operation.

Image sensor 110 is an imaging device that captures a subject image formed through interchangeable lens 200 to generate image data. Image sensor 110 is, for example, a CCD, a complementary metal oxide semiconductor (CMOS) image sensor, or an n-channel metal oxide semiconductor (NMOS) image sensor. The generated image data is digitized by analog-to-digital (AD) converter (ADC) 111. The digitized image data is subjected to a predetermined image process under control of controller 140. Examples of the predetermined image process include a gamma correction process, a white balance correction process, a flaw correction process, a YC conversion process, an electronic zoom process, and a JPEG compression process.

Image sensor 110 operates at timing controlled by timing generator 112. Image sensor 110 generates a still image, a moving image, or a through image to be recorded. The through image is mainly a moving image, and corresponds to a live view image in the present disclosure. The through image is displayed in liquid crystal monitor 120 for assisting the user to decide the composition for capturing a still image. A function to display the through image generated in real time in liquid crystal monitor 120 as described above is referred to as a "live view display".

Liquid crystal monitor 120 displays various kinds of information including images, such as a through image, and a menu screen. Any other display devices such as an organic electro luminescence (EL) display device may be used in place of the liquid crystal monitor.

Operation unit 130 includes a release button for instructing a start of shooting, a mode dial for setting a shooting mode, a power switch, and the like which are provided on the top surface of the camera body. Operation unit 130 also includes up, down, left, and right cursor buttons and a SET button which are provided on the back surface of the camera body. The cursor buttons are used for selecting items, and the SET button is used for confirming an entry. Operation unit 130 also includes a touch panel overlaid on liquid crystal monitor 120.

Card slot 170 is adapted to receive memory card 171 and controls memory card 171 under control of controller 140. Digital camera 10 can store image data into memory card 171 or read image data from memory card 171.

Power supply 160 is a circuit for supplying electric power to respective components in digital camera 10.

Body mount 150 is mechanically and electrically connectable to a lens mount of the interchangeable lens. Specifically, when the interchangeable lens mounted to the camera body is communicable with the camera body, camera body 100 can transmit and receive data to and from interchangeable lens 200 via the lens mount of the interchangeable lens.

Camera body 100 includes, as a configuration for achieving a BIS function (a function to correct a camera shake by moving image sensor 110), gyro sensor 184 (an example of the shake detector) that detects vibration of camera body 100 and BIS processor 183 for controlling a vibration correcting process based on the detection result of gyro sensor 184. Camera body 100 also includes sensor driver 181 for moving image sensor 110 and position sensor 182 for detecting a position of image sensor 110. BIS processor 183 and sensor driver 181 are an example of the image stabilization unit in the present disclosure.

Sensor driver 181 can be achieved by a magnet and a planar coil, for example. One of the magnet and the planar coil is fixed and the other is movable. Position sensor 182 is a sensor for detecting a position of image sensor 110 in a plane perpendicular to the optical axis of the optical system. Position sensor 182 can be achieved by a magnet and a Hall element, for example.

BIS processor 183 controls sensor driver 181 based on signals from gyro sensor 184 and position sensor 182 to move image sensor 110 in a plane perpendicular to the optical axis such that vibration of camera body 100 is canceled.

[1-2. Interchangeable Lens]

Interchangeable lens 200 includes the optical system and lens mount 250. The optical system includes focusing lens 210 and diaphragm 260.

Interchangeable lens 200 in the present exemplary embodiment does not have a communication function with camera body 100. Therefore, lens mount 250 mechanically connects interchangeable lens 200 to camera body 100. Further, interchangeable lens 200 does not have an image stabilization function.

[2. Operation]

An image stabilization operation of digital camera 10 having the above configuration will be described.

Since interchangeable lens 200 does not have the image stabilization function, digital camera 10 performs an image stabilization (BIS function) by moving image sensor 110 in camera body 100.

In the image stabilization, vibration of digital camera 10 is detected by gyro sensor 184, and image sensor 110 is moved by an amount according to the detected shake amount. When doing so, it is necessary that an amount of movement of image sensor 110 is determined according to the shake amount and a focal length of interchangeable lens 200. For example, when the same shake amount is detected by gyro sensor 184 between a case where an interchangeable lens having a larger focal length is mounted and a case where an interchangeable lens having a smaller focal length is mounted, image sensor 110 needs to be moved more greatly for canceling a camera shake in the former case than in the latter case. Therefore, it is necessary for camera body 100 to identify the focal length of the interchangeable lens which is mounted to camera body 100.

When the interchangeable lens has a communication function, camera body 100 can acquire information about the focal length of the interchangeable lens from the interchangeable lens via body mount 150. However, when an interchangeable lens having no communication function, such as an old lens, is mounted, camera body 100 cannot acquire information about the focal length of the interchangeable lens from the interchangeable lens. In view of this, in the present exemplary embodiment, the focal length of interchangeable lens 200 is input to camera body 100 by a manual operation performed by a user.

Figure 2:
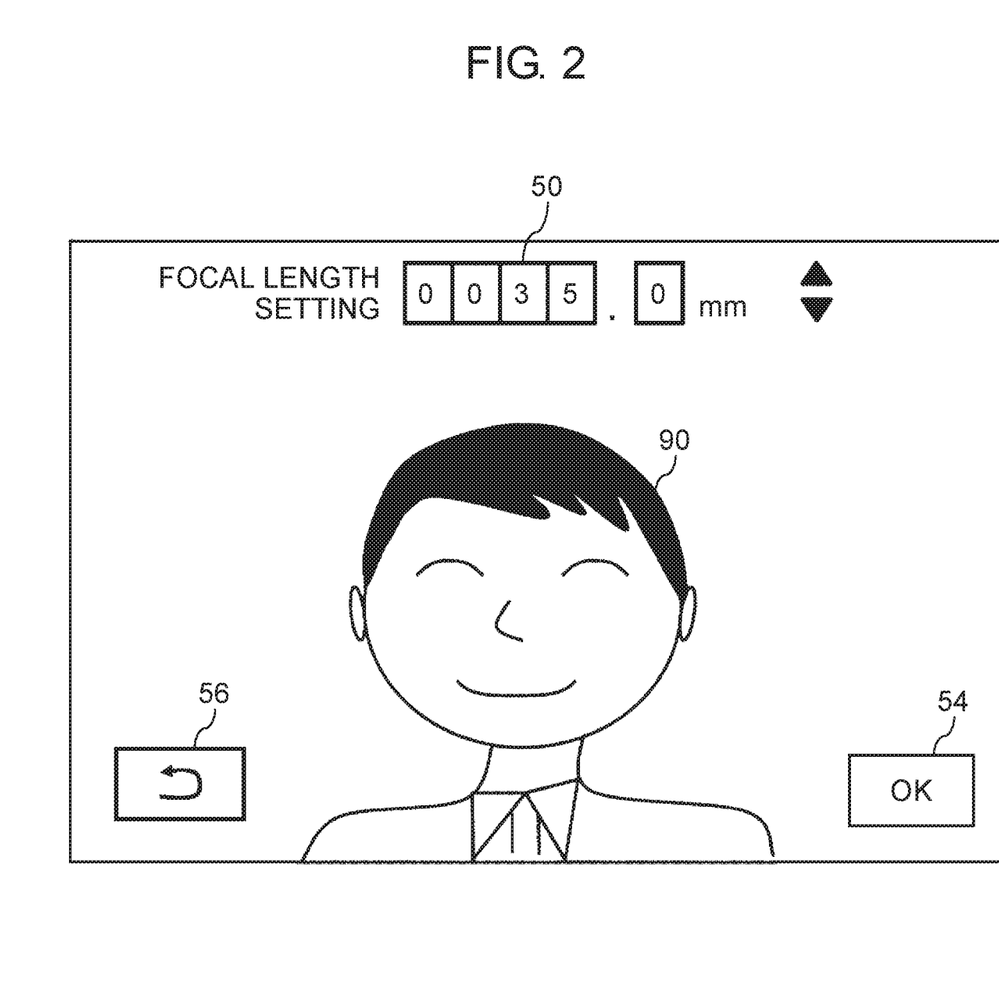
FIG. 2 is a view showing one example of a focal length setting screen.

FIG. 2 is a view showing an example of a setting screen for setting a focal length of interchangeable lens 200. The setting screen in FIG. 2 is displayed in liquid crystal monitor 120 of camera body 100 upon setting the focal length. The setting screen is displayed overlaid on the live view image (that is, through image). The setting screen includes input region 50 where an input value of the focal length is reflected, OK key 54 for finalizing the input value, and return key 56 for canceling the operation. The live view image indicates an image that displays, in real time, image 90 of a subject captured by image sensor 110 through interchangeable lens 200.

The user can input a focal length value in input region 50 of the setting screen by incrementing or decrementing the value using the up, down, left, and right cursor buttons. When the user touches OK key 54 or presses the SET button provided on the back surface of camera body 100, the input value is determined and stored as a final focal length set value. When canceling the input focal length value without determining this value, the user may only touch return key 56.

In the present exemplary embodiment, liquid crystal monitor 120 includes a touch panel serving as operation unit 130. Therefore, when the user touches the setting screen, liquid crystal monitor 120 receives at least one of the entry of the focal length value, the entry for determining the input, and the entry for canceling the input. If liquid crystal monitor 120 does not have a touch panel, other members in operation unit 130 such as a button or dial may receive the entry of the focal length value, the entry for determining the input, and the entry for canceling the input. Further, in such a case, liquid crystal monitor 120 may make a display such that the information received by operation unit 130 is reflected in the setting screen.

In the present exemplary embodiment, the value of the focal length is input in input region 50 of the setting screen. However, in place of the value of the focal length, information corresponding to the focal length may be input in input region 50. If the focal length is divided into a plurality of levels, the information corresponding to the focal length may be one of the levels, for example. At least either the focal length or the information corresponding to the focal length corresponds to the focal length information in the present disclosure.

In the present exemplary embodiment, when the SET button is pressed, the input focal length value is determined as the final focal length value. However, the depression of the SET button is not necessary for determining the focal length value. For example, when a predetermined time has elapsed after the focal length value is input, it is determined that the input value is determined, and then, the setting screen may disappear, and the display may be returned to the normal live view display.

When setting the focal length, digital camera 10 activates the image stabilization function. In the present exemplary embodiment, the information about the focal length input by the user in the setting screen is immediately reflected in the image stabilization function. Thus, the user can set the focal length while visually checking the effect of the image stabilization in the live view image on which the setting screen is displayed. Notably, it is only necessary in the present disclosure that the effect of the camera shake operation can be checked with the setting screen being displayed, and therefore, there may be a time lag until the information about the input focal length is reflected in the image stabilization function.

Figure 3:
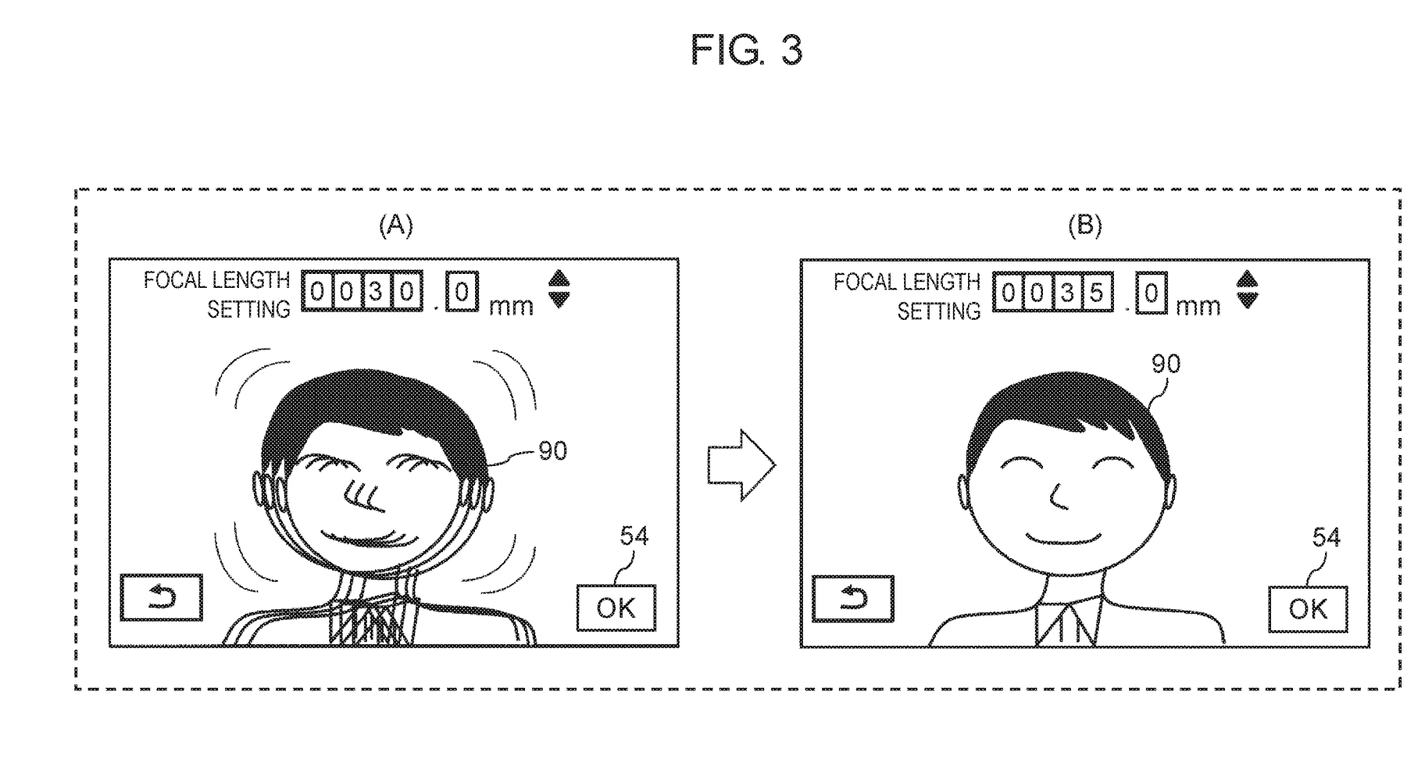
FIG. 3 is a view for describing a state where an input focal length is reflected in an image stabilization in a live view display.

FIG. 3 is a view for describing a state where the input focal length is reflected in the image stabilization in the live view display. In part (A) of FIG. 3, a value of 30.0 mm is input by the user as the focal length in the setting screen for setting the focal length. In this case, camera body 100 executes the image stabilization operation according to the detected shake amount based on the focal length value of 30.0 mm.

However, if the focal length of interchangeable lens 200 mounted to camera body 100 is actually 35.0 mm, the image stabilization cannot be precisely performed, and subject image 90 having an image blur is displayed as shown in part (A) of FIG. 3. The user who views blurred subject image 90 displayed in liquid crystal monitor 120 can find that the input focal length is not proper, and can input a more proper focal length value (35.0 mm in this case).

Thus, the user can see subject image 90 which is not blurred as shown in part (B) of FIG. 3. When the user touches OK key 54 with this state, the input "35.0 mm" is determined as the focal length value, and stored in flash memory 142 as the information about the focal length of interchangeable lens 200.

In this way, the user can set the information about the focal length of the interchangeable lens while viewing the live view image displayed in liquid crystal monitor 120. Therefore, the user can immediately check the effect of the focal length set by himself/herself on the image stabilization, and thus can easily and quickly set a more proper focal length.

Figure 4:
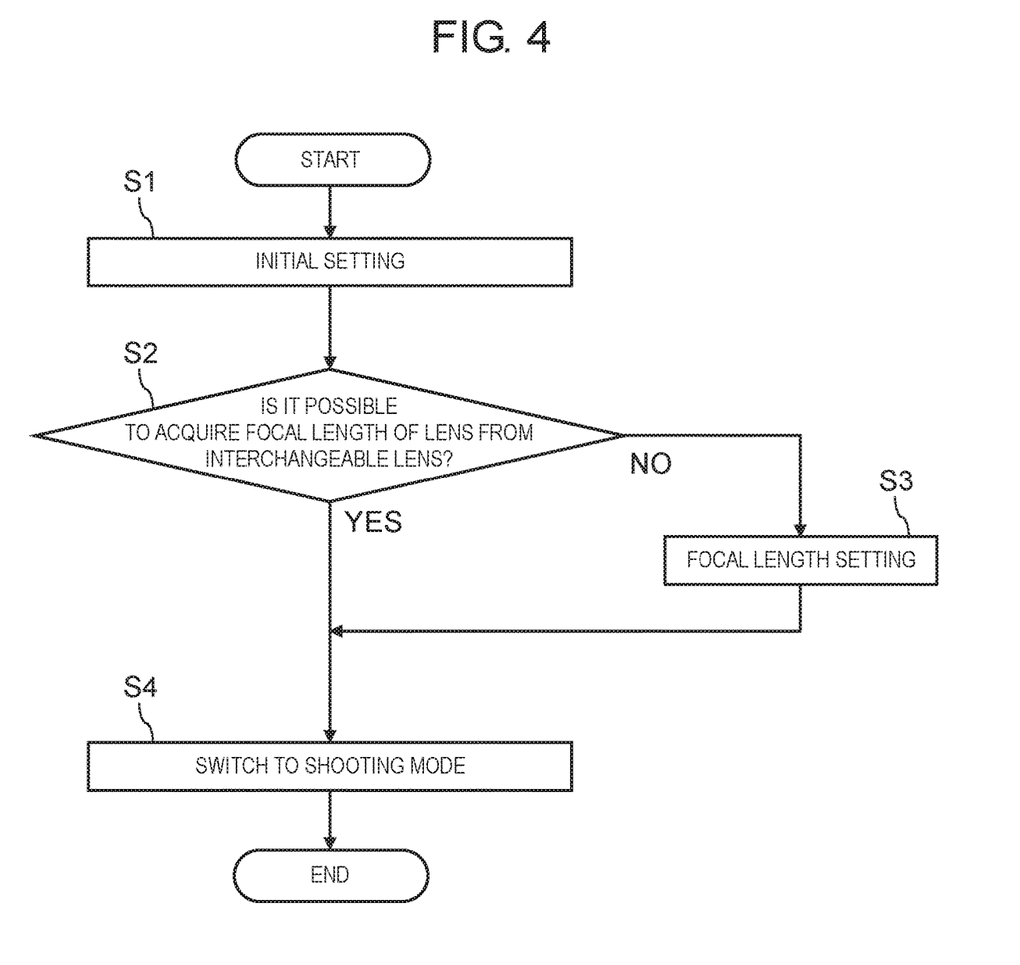

The process for setting the focal length to camera body 100 is executed when the power supply of digital camera 10 is turned on or according to the user operation. FIG. 4 is a flowchart showing a process when the power supply of digital camera 10 is turned on. The focal length setting process executed when the power supply of digital camera 10 is turned on will be described with reference to FIG. 4.

In FIG. 4, when the power supply of digital camera 10 is turned on, controller 140 in camera body 100 executes an initial setting operation with the live view image being displayed in liquid crystal monitor 120 (S1). The initial setting operation includes an operation for acquiring, from the interchangeable lens mounted to camera body 100, lens information inherent to the interchangeable lens. The lens information includes information indicating the focal length of the lens.

After the initial setting operation is ended, controller 140 determines whether the information indicating the focal length has been acquired from the interchangeable lens (S2).

When the information indicating the focal length has been acquired from the interchangeable lens (YES in S2), controller 140 switches to a shooting mode (S4). If the interchangeable lens mounted to camera body 100 has a communication function, camera body 100 can acquire the lens information from the interchangeable lens during the initial setting operation. Therefore, in this case, controller 140 switches to the shooting mode.

On the other hand, when the information indicating the focal length has not been acquired from the interchangeable lens (NO in S2), controller 140 executes the focal length setting process for allowing the user to input the focal length of the interchangeable lens (S3). If the interchangeable lens mounted to camera body 100 does not have a communication function as in interchangeable lens 200 in the present exemplary embodiment, camera body 100 cannot acquire the lens information from the interchangeable lens during the initial setting operation. In such a case, controller 140 executes the focal length setting process (step S3).

Note that the focal length setting process (step S3) is not limited to be executed when the power supply of digital camera 10 is turned on, and is also executed when the user selects "focal length setting" from the menu screen.

Figure 5:
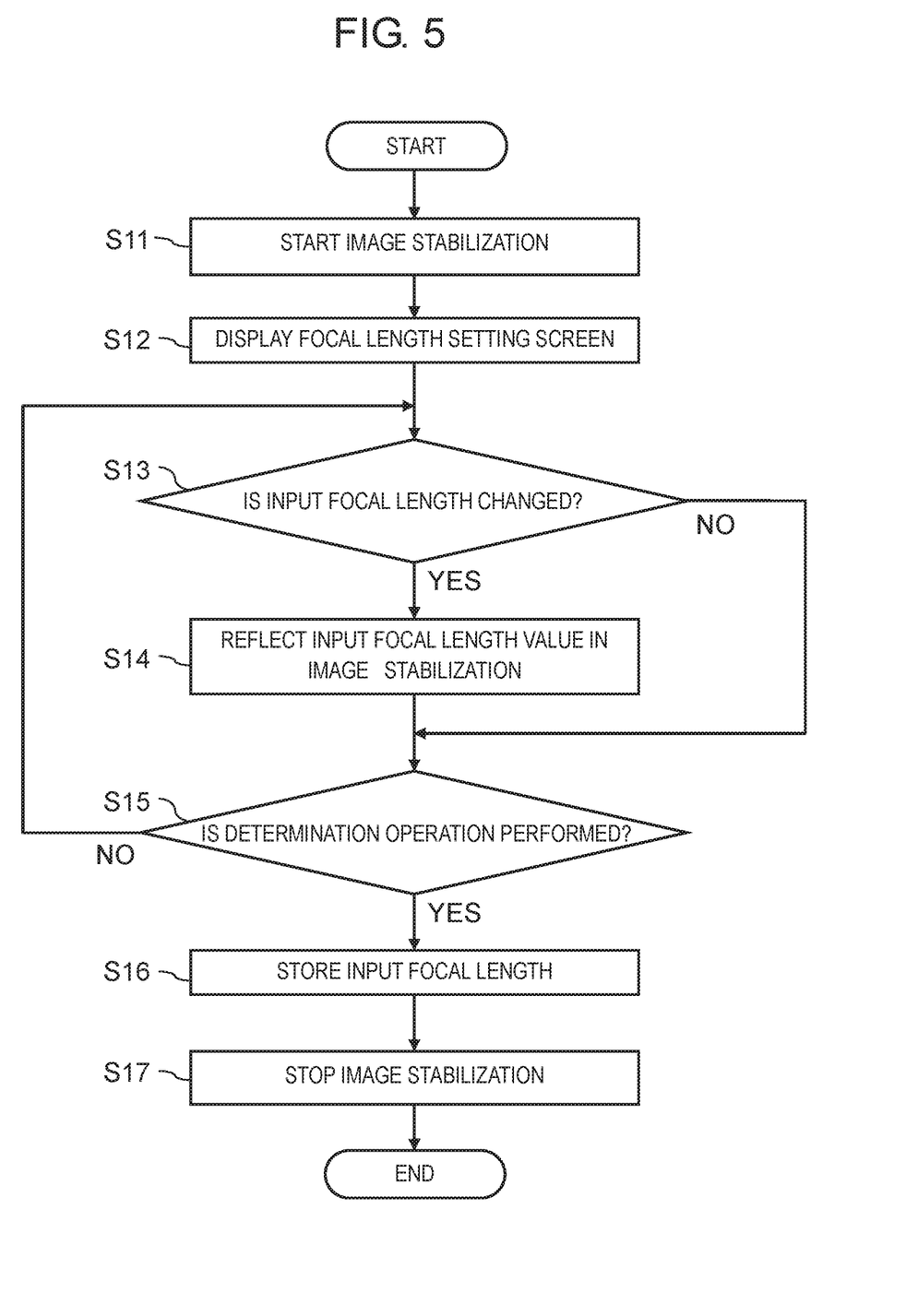
FIG. 5 is a flowchart regarding a focal length setting process in the first exemplary embodiment.

FIG. 5 is a flowchart regarding the focal length setting process (step S3 in the flowchart in FIG. 4).

In FIG. 5, controller 140 firstly starts the image stabilization operation (S11). During the image stabilization operation, BIS processor 183 controls sensor driver 181 such that image sensor 110 is moved based on the detection signal from gyro sensor 184.

Controller 140 displays the focal length setting screen shown in FIG. 2 (S12). The focal length setting screen is displayed overlaid on the live view image. The setting screen is a screen in which input region 50 for the focal length, OK key 54, and return key 56 are displayed. The live view image is an image captured by image sensor 110 through interchangeable lens 200. Therefore, the live view image is an image in which the image stabilization function is reflected in real time.

Controller 140 determines whether the focal length value input by the user is changed (S13).

If the input focal length value is changed, that is, if a new focal length value is set by the user (YES in S13), controller 140 reflects the new focal length value currently set in the setting screen in the image stabilization operation (S14).

Then, controller 140 detects whether the user performs an operation for determining the input focal length value (S15). Specifically, controller 140 determines whether OK key 54 (or SET button) is operated in the setting screen. When the operation for determining the input focal length value is not performed (NO in S15), that is, when OK key 54 (or SET button) is not operated, controller 140 repeats the above processes until the operation for determining the input focal length value is performed (S13 to S15).

On the other hand, when the operation for determining the input focal length value is performed by the user (YES in S15), that is, when OK key 54 (or SET button) is operated, controller 140 determines the value set in the setting screen and displayed in the setting screen as a focal length set value, and stores this value into flash memory 142 (S16).

Then, controller 140 stops the image stabilization operation (S17). Note that, in the present exemplary embodiment, when the release button is half pressed after step S17, the image stabilization is started using the input focal length information. Therefore, once the entry of the focal length information is determined, the image stabilization operation is stopped (step S17). The operation of stopping the image stabilization operation (step S17) described above is merely one example, and the image stabilization operation may not be stopped. In other words, step S17 may be skipped. Specifically, the image stabilization may be executed every time the live view image is displayed. In such a case, when the initial setting (step S1) in FIG. 4 is started, the image stabilization operation is also started. Therefore, the start (step S11 in FIG. 5) of the image stabilization operation after the start of the initial setting is skipped. Further, after the focal length information is determined (YES in step S15 in FIG. 5) and stored (step S16), the image stabilization operation is not stopped but continued. In addition, the user may set whether to constantly perform the image stabilization or perform the image stabilization after the release button is half pressed, using the menu screen.

As described above, the user can check the effect of the image stabilization in which the focal length value is reflected in the live view image on which the focal length setting screen is overlaid. That is, the user can adjust the focal length value while checking the effect of the image stabilization, thereby being capable of setting a more proper focal length value.

Figure 6:
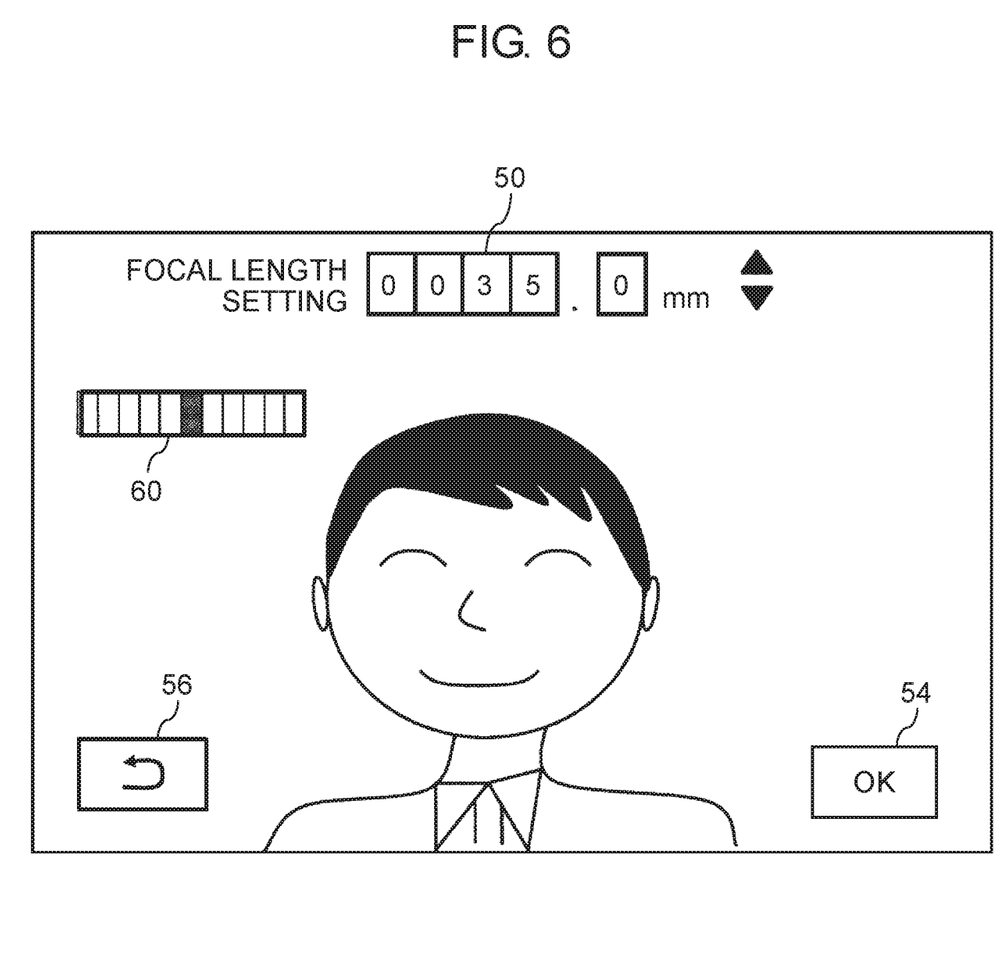
FIG. 6 is a view showing a shake amount indicator displayed in the focal length setting screen.
Figure 7:
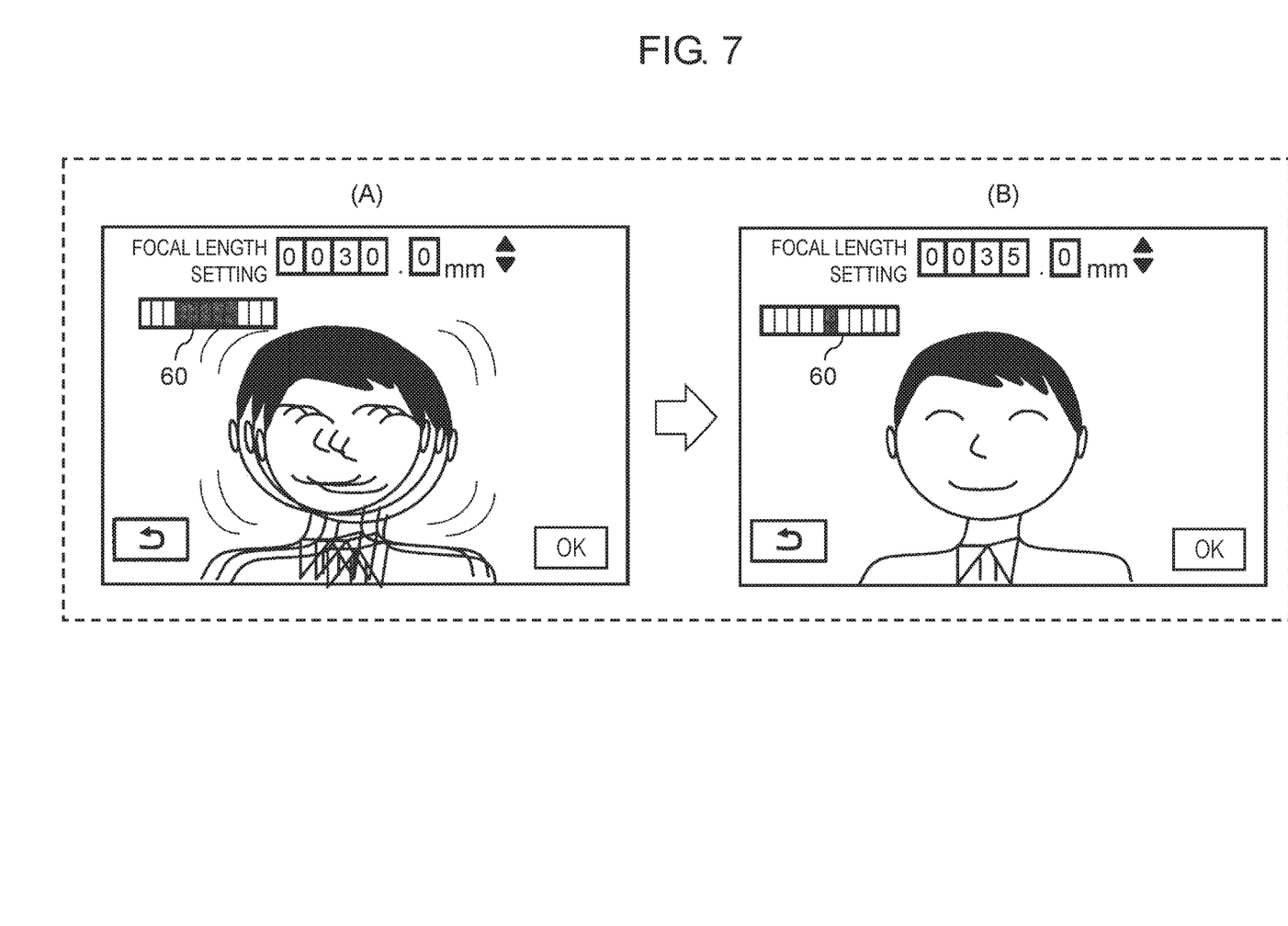
FIG. 7 is a view for describing a change in the shake amount indicator.

Digital camera 10 may display an indicator that quantitatively displays a blur amount in order that the user can recognize the effect of the image stabilization more easily in the focal length setting screen. FIG. 6 is a view showing an example of a shake amount indicator that quantitatively displays a blur amount. Shake amount indicator 60 shown in FIG. 6 indicates a magnitude of the blur amount of an image after the image stabilization by a number of colored blocks. FIG. 7 is a view showing a change in shake amount indicator 60. Part (A) of FIG. 7 shows a display state of shake amount indicator 60 when the blur amount of an image after the image stabilization is relatively large. Part (B) of FIG. 7 shows a display state of shake amount indicator 60 when the blur amount of an image after the image stabilization is relatively small. In this way, shake amount indicator 60 changes the display state according to the blur amount of the image. The user can easily recognize the effect of the image stabilization by referring to shake amount indicator 60 described above.

Figure 8:
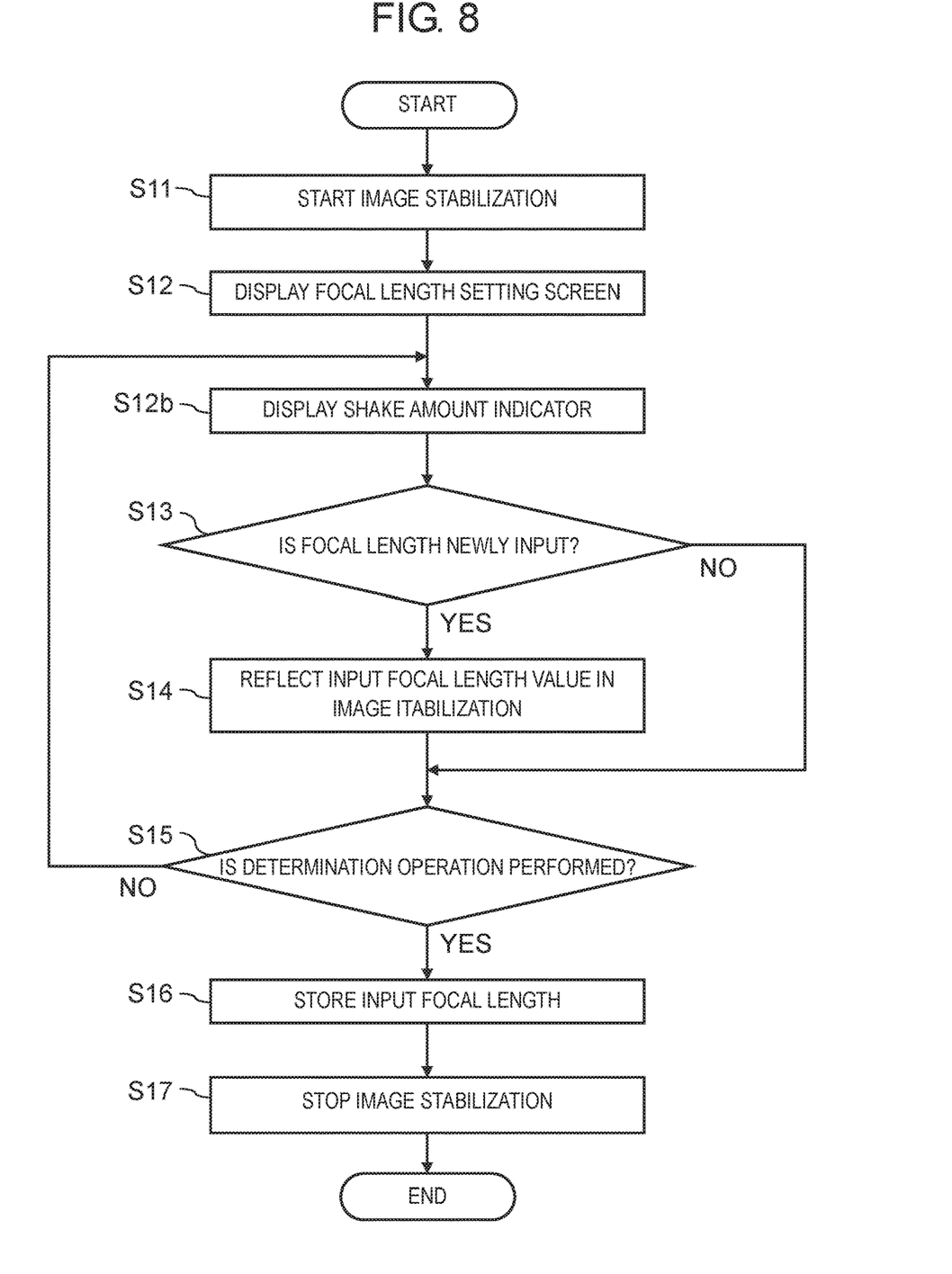
FIG. 8 is a flowchart regarding a focal length setting process, when the shake amount indicator is displayed.

FIG. 8 is a flowchart regarding a focal length setting process when shake amount indicator 60 is displayed. This flowchart is achieved by adding a process (step S12b) for displaying the shake amount indicator to the flowchart shown in FIG. 5. Controller 140 obtains, for each frame of the captured image, a motion vector with respect to the frame, and obtains a difference in motion vectors between frames, thereby calculating a blur amount. Controller 140 then changes the display state of the shake amount indicator according to the magnitude of the calculated blur amount. The motion vector of each frame can be calculated with known methods (for example, see Unexamined Japanese Patent Publication No. 2017-219635). As described above, controller 140 obtains the blur amount based on a difference in motion vectors between frames, thereby being capable of obtaining the magnitude of the blur occurring in the image after the image stabilization with high precision.

Figure 9:
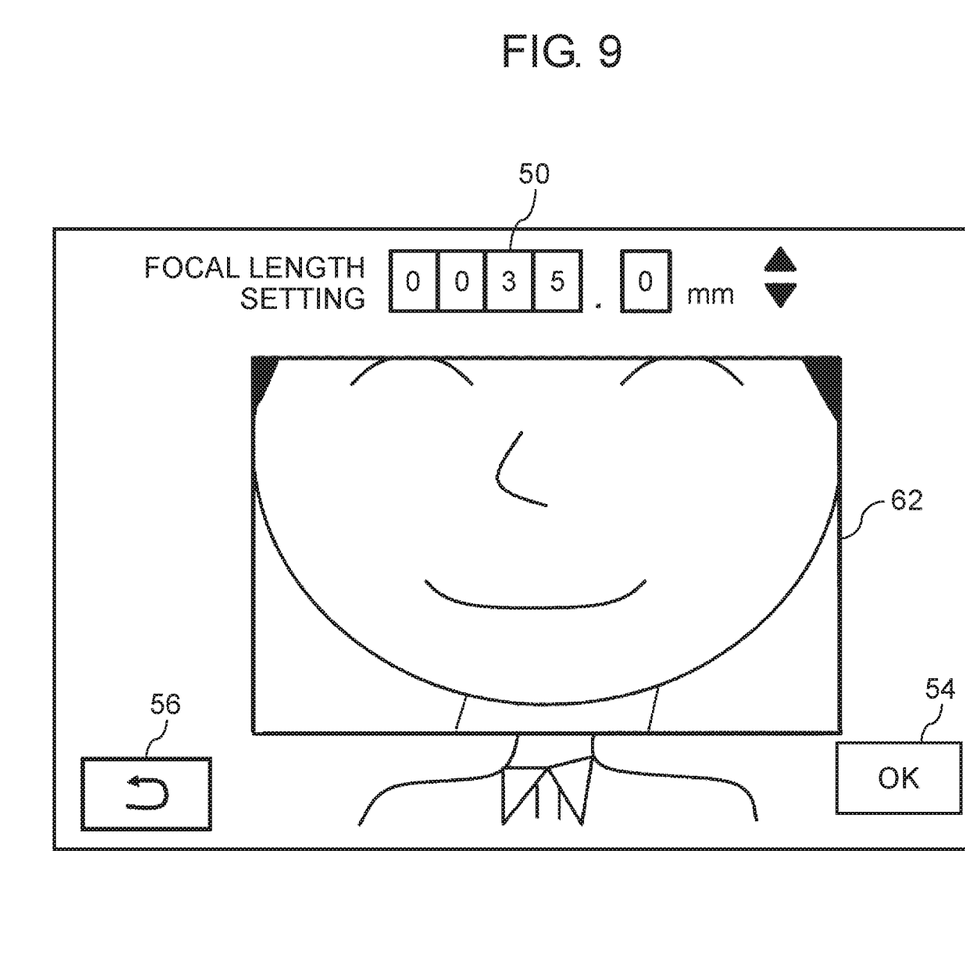
FIG. 9 is a view for describing a state where a part of a region of the live view image on which the focal length setting screen is overlaid is enlarged.

In the focal length setting screen, the entire or a portion of the live view image on which the focal length setting screen is to be displayed overlaid may be enlarged so that the user can recognize the magnitude of an image blur more easily. FIG. 9 is a view for describing a state in which a part of a region in the focal length setting screen is enlarged. For example, when a predetermined operation is performed with the focal length setting screen being displayed as shown in FIG. 2, the image may be enlarged as shown in FIG. 9. In the example in FIG. 9, the live view image on which the setting screen is to be overlaid is displayed in such a way that a part of a region in the center of the live view image is enlarged. In such enlarged image 62, a camera shake is also enlarged and displayed, so that the user can more easily recognize the camera shake. Note that the region to be enlarged may be a central region of the live view image or another region. For example, the region to be enlarged may be a region where a human face is displayed, or any region selected by the user. When the user selects any region, the user may touch and select the region, or may move a frame displayed in the screen to a desired position to select the region. The initial position of the frame (that is, the position before the user moves the frame) may be located inside or outside the live view image. The frame may be moved by means of a touch panel, an arrow key, or a joystick, for example.

Figure 10:
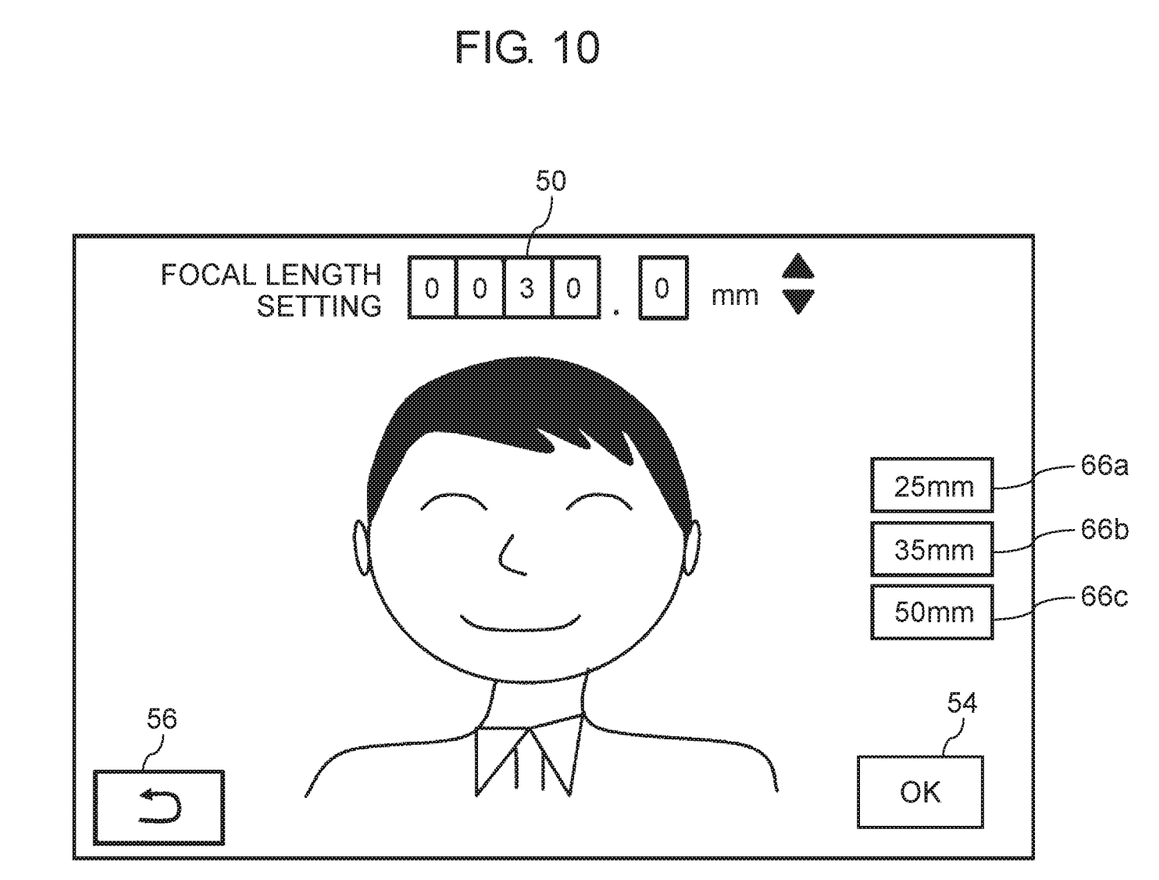
FIG. 10 is a view for describing a focal length setting screen which allows the user to select a focal length set value from among registered focal length set values.

When setting (inputting) a focal length, the user may select any value from among focal length set values which have been previously set. To this end, controller 140 registers focal length values previously set by the user. The registered set values are stored in flash memory 142. FIG. 10 is a view for describing an example of a focal length setting screen by which the user can select any one of a plurality of registered and previously set focal length values. In the setting screen shown in FIG. 10, three values, i.e., "25 mm", "35 mm", and "50 mm", are registered. The user can select any one of icons 66a to 66c of "25 mm", "35 mm", and "50 mm" by operating operation unit 130 (for example, up or down cursor button) or by a touch operation.

Figure 11:
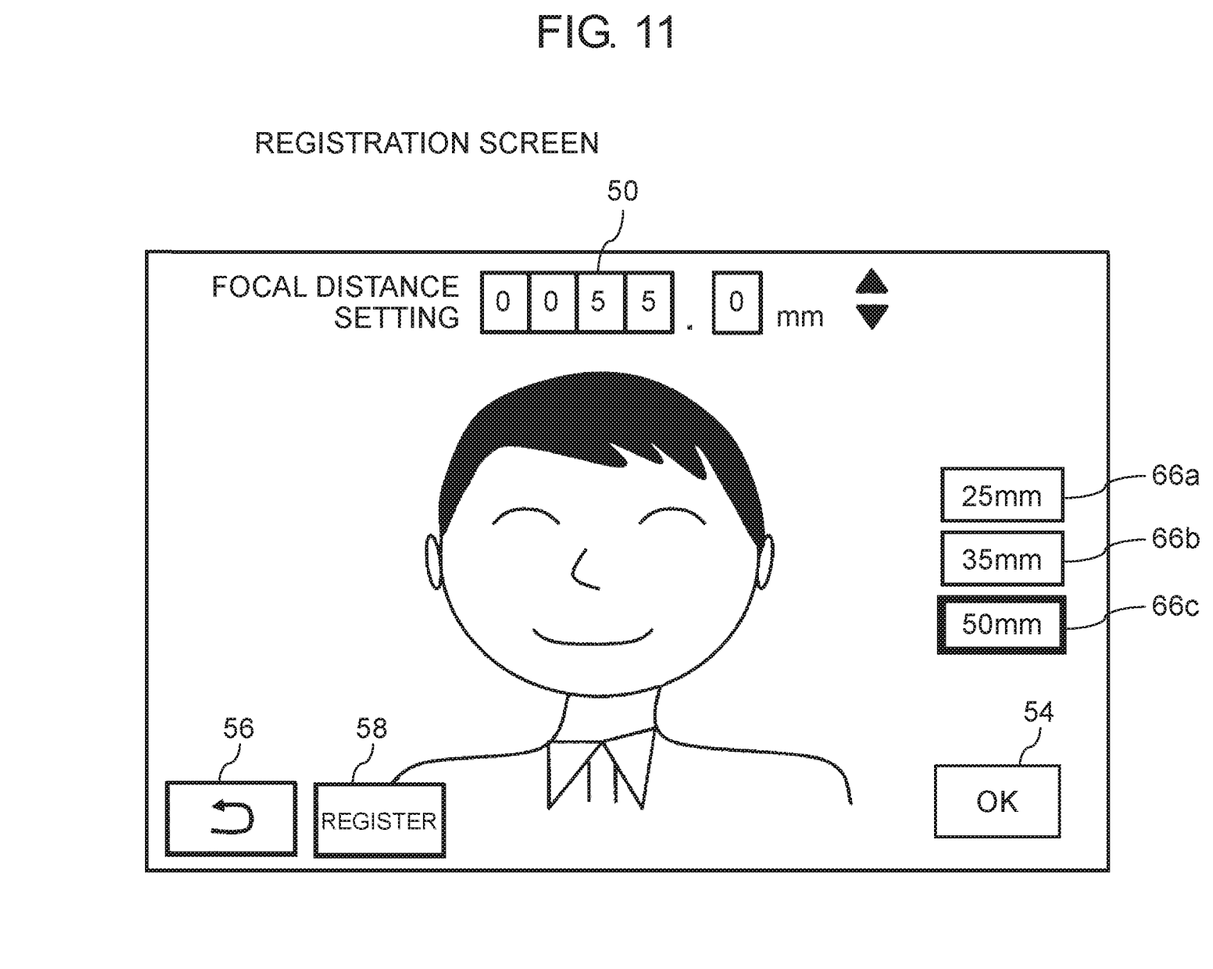
FIG. 11 is a view for describing a function enabling registration of a focal length set value in the focal length setting screen.

FIG. 11 is a view showing an example of a setting screen for registering a focal length set value. Herein, a maximum of three set values can be registered, for example. In the example in FIG. 11, three values, that is, "25 mm", "35 mm", and "50 mm", are already registered. The user can register the set value which is input in input region 50 by touching register button 58 or SET button. When three set values are already registered, a set value which is to be deregistered and replaced with a newly registered value is manually or automatically designated. In the example in FIG. 11, when register button 58 is operated with the set value of "50 mm" which has been registered being designated as a value to be deregistered, for example, the value of "55 mm" which is currently input is registered in place of "50 mm" which has been registered. The configuration described above in which the user can select any one of a plurality of previously set values enables a quick operation for inputting a focal length, which leads to improvement of convenience of the user.

[3. Effects and Other Related Features]

As described above, digital camera 10 or camera body 100 in the present exemplary embodiment is an imaging apparatus to which interchangeable lens 200 is mountable. Digital camera 10 or camera body 100 includes image sensor 110 (an example of the imaging device) that generates image data based on an image formed through interchangeable lens 200, gyro sensor 184 (an example of the shake detector) that detects a shake amount of digital camera 10 or camera body 100, BIS processor 183 and sensor driver 181 (an example of the image stabilization unit) that performs a image stabilization operation by moving imaging device 110 based on the detected shake amount and a focal length of interchangeable lens 200, liquid crystal monitor 120 (an example of the display unit) that displays a setting screen for inputting focal length information that is at least the focal length of interchangeable lens 200 or information corresponding to the focal length, and controller 140 (an example of the controller) that controls liquid crystal monitor 120 as well as sensor driver 181 and BIS processor 183. In this configuration, an image generated based on the image data generated by image sensor 110 in real time is defined as a live view image. Controller 140 reflects the focal length information displayed in the setting screen in the image stabilization operation performed by sensor driver 181 and BIS processor 183, while causing liquid crystal monitor 120 to display and overlay the setting screen on the live view image.

As described above, when the focal length information is input, the input focal length information is reflected in the setting screen and is further reflected in the live view image, whereby the user can determine whether the input focal length information is proper while viewing the live view image. When determining that the camera shake is not sufficiently corrected in the live view image, the user can change the focal length information while viewing the setting screen, and immediately check the effect of the image stabilization based on the newly input focal length information. Accordingly, the user can set proper focal length information.

In addition, controller 140 may cause liquid crystal monitor 120 to display shake amount indicator 60 quantitatively indicating a magnitude of the blur of the live view image in the setting screen (see FIGS. 6 and 7). With this, the user can easily check the effect of the image stabilization.

In addition, controller 140 may cause liquid crystal monitor 120 to enlarge and display at least a part of a region of the live view image on which the setting screen is overlaid (see FIG. 9). With this, the user can easily check the effect of the image stabilization.

Further, controller 140 may cause liquid crystal monitor 120 to display, in the setting screen, at least one of the previously set focal length information. Controller 140 may then input the focal length information selected by the user from among displayed focal length information as the focal length information of interchangeable lens 200 (see FIG. 10). This configuration can improve the convenience when the user inputs the focal length.

In addition, controller 140 may reflect the input focal length information in the image stabilization operation performed by sensor driver 181 and BIS processor 183, before the setting screen receives determination of the input focal length information. With this, the user can adjust the focal length information to be input, while checking the effect of the image stabilization in the live view image. The user can also determine the input focal length information, while checking the effect of the image stabilization in the live view image.

Digital camera 10 or camera body 100 in the present exemplary embodiment is an imaging apparatus to which interchangeable lens 200 is mountable. Digital camera 10 or camera body 100 includes image sensor 110 (an example of the imaging device) that generates image data based on an image formed through interchangeable lens 200, gyro sensor 184 (an example of the shake detector) that detects a shake amount of digital camera 10 or camera body 100, BIS processor 183 and sensor driver 181 (an example of the image stabilization unit) that performs an image stabilization operation by moving image sensor 110 based on the detected shake amount and a focal length of interchangeable lens 200, liquid crystal monitor 120 (an example of the display unit) that displays a setting screen for inputting focal length information that is at least the focal length of interchangeable lens 200 or information corresponding to the focal length, and controller 140 (an example of the controller) that controls liquid crystal monitor 120 as well as BIS processor 183 and sensor driver 181. Controller 140 causes liquid crystal monitor 120 to display shake amount indicator 60 (an example of the information quantitatively indicating a magnitude of the blur of the live view image) in the setting screen. The live view image is generated based on the image data generated by image sensor 110 in real time.

Other Exemplary Embodiments

The idea of the above exemplary embodiment is not limited to the exemplary embodiment described above. Various kinds of exemplary embodiments may be possible.

Other exemplary embodiments to which the idea of the above exemplary embodiment is applicable will be described below.

In the above exemplary embodiment, shake amount indicator 60 is described as the information quantitatively indicating a magnitude of the blur of the live view image. Shake amount indicator 60 is one example, and information to be displayed in any other display modes may be displayed, so long as it quantitatively indicates the magnitude of the blur.

In the examples shown in FIGS. 10 and 11, digital camera 10 enables registration of three focal length set values, and the user can select any one of these three values. However, the number of set values to be registered and selected is not limited to three. In addition, although only focal length set values are registered, lens names of interchangeable lenses may also be registered in association with the focal length set values. In such a case, lens names of interchangeable lenses are also displayed in the setting screen shown in FIG. 10 as well as focal length set values, and thus, the convenience of the user upon selecting one of the focal length set values is improved.

The exemplary embodiments have been described herein as examples of the technique in the present disclosure. For that purpose, the detailed description and the accompanying drawings have been provided. Therefore, components in the accompanying drawings and the detailed description may include components that are not essential for solving problems. Accordingly, such inessential components should not be readily construed as being essential based on the fact that such inessential components are included in the detailed description and the accompanying drawings.

The above exemplary embodiments are provided to illustrate the technique in the present disclosure. Therefore, various changes, replacements, additions, and/or omissions, for example, may be applied to the above exemplary embodiments within the scope of the claims or equivalents thereof.

The idea of the present disclosure is applicable to an imaging apparatus to which an interchangeable lens is mountable and which has an image stabilization function.

What is claimed is:

1. An imaging apparatus to which an interchangeable lens is mountable, the imaging apparatus comprising:
    an imaging device that generates image data based on an image formed through the interchangeable lens;
    a shake detector that detects a shake amount of the imaging apparatus;
    an image stabilization unit that performs an image stabilization operation by moving the imaging device based on the detected shake amount and a focal length of the interchangeable lens;
    a display unit that displays a setting screen for inputting a focal length information item that is at least one of the focal length of the interchangeable lens and information corresponding to the focal length; and
    a controller that controls the display unit and the image stabilization unit,
    wherein an image generated based on the image data generated by the imaging device in real time is defined as a live view image, and
    the controller causes the image stabilization unit to perform the image stabilization operation in accordance with the focal length information item received via the setting screen, while causing the display unit to display and overlay the setting screen on the live view image.

2. The imaging apparatus according to claim 1, wherein the controller causes the display unit to display information quantitatively indicating a magnitude of a blur of the live view image in the setting screen.

3. The imaging apparatus according to claim 1, wherein the controller causes the display unit to enlarge and display at least a part of a region of the live view image, when causing the display unit to display the setting screen.

4. The imaging apparatus according to claim 1, wherein the controller causes the display unit to display, in the setting screen, one or more focal length information items, the one or more focal length information items each being previously set as the focal length information item for the interchangeable lens, and inputs, as the focal length information item for the interchangeable lens, a focal length information item selected by a user from among the one or more displayed focal length information items.

5. The imaging apparatus according to claim 1, wherein the controller causes the image stabilization unit to reflect the input focal length information in the image stabilization operation, before the setting screen receives determination of the input focal length information.

6. An imaging apparatus to which an interchangeable lens is mountable, the imaging apparatus comprising:
   an imaging device that generates image data based on an image formed through the interchangeable lens;
   a shake detector that detects a shake amount of the imaging apparatus;
   an image stabilization unit that performs an image stabilization operation by moving the imaging device based on the detected shake amount and a focal length of the interchangeable lens;
   a display unit that displays a setting screen for inputting focal length information item that is at least one of the focal length of the interchangeable lens and information corresponding to the focal length; and
   a controller that controls the display unit and the image stabilization unit,
   wherein the controller causes the display unit to display information quantitatively indicating a magnitude of a blur of a live view image in the setting screen,
   the live view image is generated based on the image data generated by the imaging device in real time.

* * * * *